3,113,163
RECOVERY OF TERTIARY OLEFINS
William R. Edwards, George W. Berner, Jr., and Robert D. Wesselhoft, Baytown, Tex., assignors, by mesne assignments, to Esso Research and Engineering Company, Elizabeth, N.J., a corporation of Delaware
Filed Dec. 24, 1959, Ser. No. 861,882
8 Claims. (Cl. 260—677)

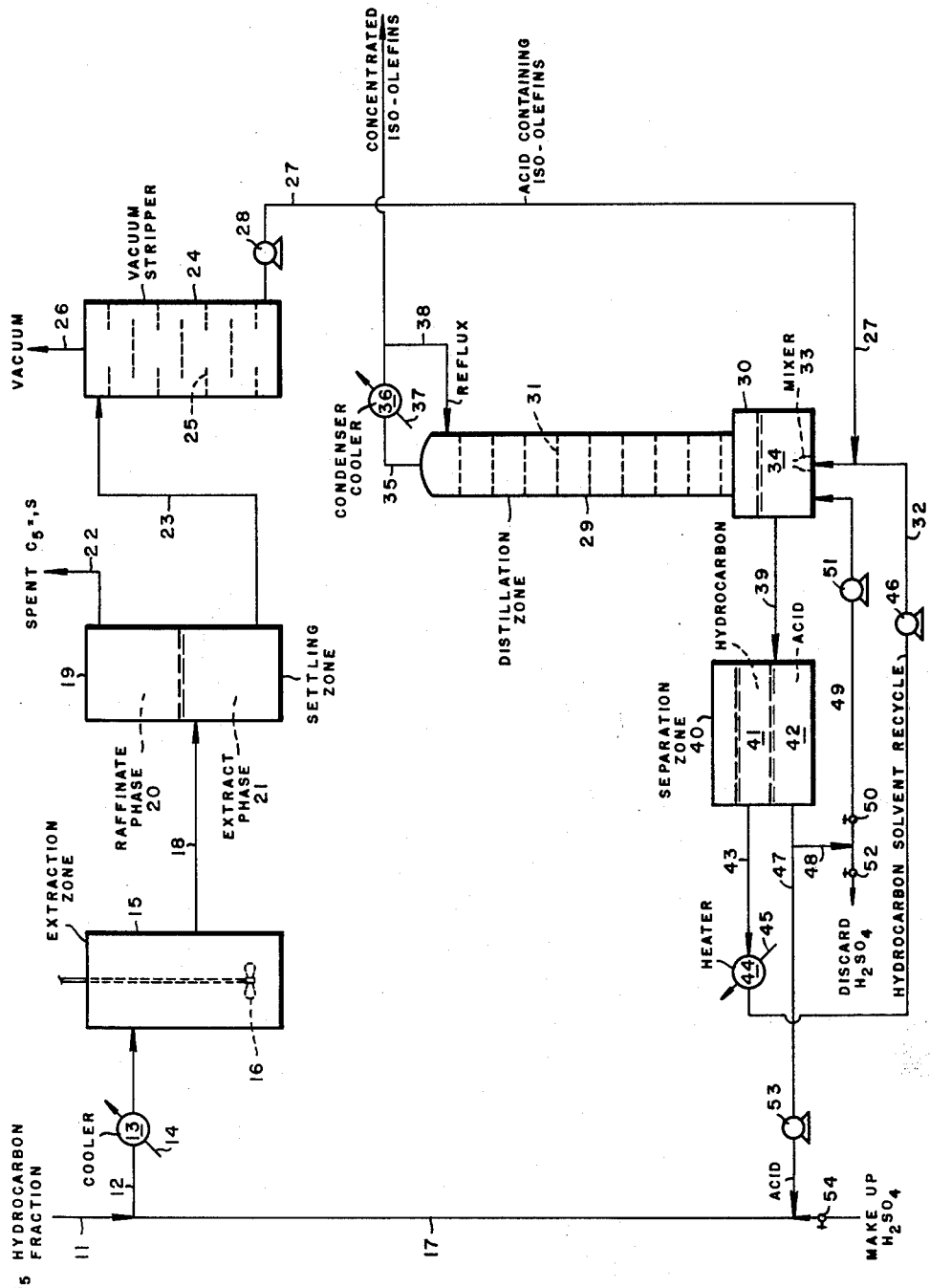

The present invention is directed to a method for recovering purified tertiary olefins. More particularly, the invention is concerned with recovering purified tertiary olefins in which the tertiary olefins are extracted from their mixtures with other hydrocarbons. In its most specific aspects, the invention is concerned with the sulfuric acid extraction of tertiary olefins from their mixtures with other isomeric compounds.

The present invention may be briefly described as a method for recovering purified olefins in which a 60 to 80 percent sulfuric acid extract of a tertiary olefin having 4 to 6 carbon atoms in the molecule is contacted with a hydrocarbon solvent boiling within the range from about 32° to about 350° F. at a temperature at least about the boiling point of the solvent under conditions such that the tertiary olefin is predominantly in the vapor phase for a sufficient length of time to form an admixture and then distilling the admixture at about the boiling point of the solvent to recover the tertiary olefin in purified condition. Thus the hydrocarbon solvent may suitably be at a temperature of at least its boiling point at the pressure employed. It may be desirable to superheat the hydrocarbon prior to contact with the acid extract.

In practicing the present invention, the extract of the tertiary olefin is formed by extracting a tertiary olefin having 4 to 6 carbon atoms in the molecule from olefinic mixtures with 60 to 80 percent sulfuric acid at a temperature within the range from about 20° to about 130° F. to form an acid extract and a raffinate phase. The phases are separated, and dissolved hydrocarbons are stripped from the acid extract phase by reducing the pressure on the acid extract phase whereby the dissolved hydrocarbons are removed. The stripped extract phase is then contacted with the hydrocarbon solvent under conditions such that the tertiary olefin is predominantly in the vapor phase to form the admixture which is then distilled. This is accomplished by heating the hydrocarbon solvent to its boiling point at the pressure employed. It may be desirable also to superheat the hydrocarbon.

In the practice of the present invention, it is contemplated that the acid from which the olefin is distilled will be allowed to separate into a hydrocarbon solvent phase and an acid phase with the hydrocarbon solvent phase being recycled for admixture with the stripped extract while the acid may be recycled to form additional quantities of the extract phase.

The olefins which may be treated in accordance with the present invention include the olefinic mixtures containing 4 to 6 carbon atoms in the molecule and containing a tertiary olefin having a double bond adjacent an alkyl substituted carbon atom. As examples of the tertiary olefin may be mentioned isobutylene, 2-methylbutene-1, 2-methylbutene-2, 3-methylpentene-2, 2-methylpentene-2, 2-ethylbutene-1, and 2-ethylbutene-2. These tertiary olefins may suitably be extracted from their mixtures with the $C_4$ to $C_6$ hydrocarbons. Thus, isobutylene would be extracted from $C_4$ hydrocarbon mixtures whereas the methylbutenes will be extracted from the $C_5$ olefinic mixtures while the methylpentenes and ethylbutenes will be extracted from the hexene fractions.

The hydrocarbon solvent employed in the practice of the present invention may suitably include the $C_4$ to $C_{12}$ hydrocarbons which may boil in the range from about 32° to about 350° F. Exemplary of the hydrocarbon solvent which may be suitable for distilling isobutylene from the solvent admixture will include n-butane, the pentanes, hexanes, octane, toluene and even the polymer formed by polymerization of isobutylene, pentenes, and the hexenes.

It will be desirable to use n-butanes and pentanes only when isobutylene is the tertiary olefin. When the higher tertiary olefins are recovered, it will be desirable to use the higher boiling compounds. The ratio of solvent to extract may suitably be in the range from about 0.1:1 to about 20:1.

In the step of distilling the admixture to recover the tertiary olefin, the tertiary olefin will be recovered at the temperature of the boiling point of the hydrocarbon solvent. For example, when isooctane is the solvent, 210° F. will be satisfactory, whereas with n-hexane as the solvent, a temperature of 155° F. may be employed.

Pressure employed may suitably be in the range from about 0 to about 250 pounds per square inch gauge.

In forming the solvent admixture, the heated hydrocarbon solvent in a vaporous condition or vapor-liquid condition is contacted with the sulfuric acid extract for a time in the range from about 0.01 to about 600 seconds such that the tertiary olefin is predominantly in a vaporized condition. While the broad range of time of contact is satisfactory, ordinarily, shorter contact time in the range from about 0.01 to about 300 seconds may be employed.

In distilling the solvent admixture, the olefins in the acid phase may range from 0.01 to 0.02 percent by weight of the olefins in the hydrocarbon phase of the solvent admixture. The olefins in the hydrocarbon phase of the solvent admixture may range from 0.5 to about 5 percent by weight of the hydrocarbon phase. This ratio of olefins in the hydrocarbon phase may suitably be controlled by controlling the reflux ratio and the product take-off in the distillation of the tertiary olefin to recover same.

The present invention will be further illustrated by referring to the drawing in which the flow diagram is that of a preferred mode.

Referring now to the drawing, numeral 11 designates a charge line by way of which a feed fraction which may suitably be a $C_5$ fraction is introduced into the system from a source, not shown. Table I which follows gives the boiling points of the various $C_5$ hydrocarbons which may normally be encountered in a typical feed to the present invention.

TABLE I
*Boiling Points of the $C_5$'s*

| Compound: | Boiling point, ° F. |
|---|---|
| Isopentane | 82 |
| n-Pentane | 97 |
| 3-methylbutene-1 | 68 |
| Pentene-1 | 86 |
| 2-methylbutene-1 | 88 |
| trans-Pentene-2 | 97 |
| cis-Pentene-2 | 98 |
| 2-methylbutene-2 | 101 |
| Isoprene | 93 |
| trans-Piperylene | 108 |
| cis-Piperylene | 111 |

Ordinarily, the diolefins may be absent, or if present, they may be present in minor amounts.

The $C_5$ olefinic mixture is introduced by line 11 into line 12 and is flowed through a refrigeration zone 13 through which a cooling medium is flowed by way of line 14 to reduce the temperature of the $C_5$ hydrocarbon to a temperature in the range from 20° to 70° F. The cooled $C_5$ hydrocarbon is then introduced into an extraction zone 15 provided with a stirring means 16 which is suitably rotated by a prime mover, not shown. The $C_5$ hydrocarbons in zone 15 are in admixture with 60 to 80 percent sulfuric acid introduced into line 12 by way of line 17 from a source which will be described further hereinafter and are charged through line 12 into zone 15. A suitable contact time is maintained in zone 15 which may include a residence time in the range from 30 to 60 minutes, and as the result, there is formed a mixture of $C_5$ hydrocarbons and sulfuric acid which is discharged from zone 15 by line 18 into a settling zone 19 wherein a raffinate phase 20 separates from an acid extract phase 21, zone 19 being of sufficient size to provide a residence time for separation of the raffinate and extract phases. The raffinate phase is discharged from the system by line 22 while the extract phase is discharged by line 23 into a stripping zone 24 provided with internal baffling means 25 and which is connected to a source of reduced pressure or vacuum by way of line 26. The reduced pressure in zone 24 may suitably be in the range from about 1 to about 29 inches of mercury absolute whereby any dissolved hydrocarbons such as pentanes and unreacted olefins are removed by way of line 26. The stripped extract phase then is discharged from zone 24 by line 27 and is pumped by pump 28 into a distillation zone 29 provided with a still 30 and with internal vapor-liquid contacting means illustrated by bell cap trays 31. The acid extract in line 27 is contacted with a hydrocarbon solvent at a temperature at least about the boiling point thereof introduced by line 32 in a vaporous condition or partially vaporized condition, and the acid extract and hydrocarbon solvent are admixed in a mixer 33 which is arranged interiorly of the still 30. While mixer 33 is shown as a jet, other mixing devices such as orifice type mixers may be used and the mixer may be external to the still 30 as may be desired. A level 34 of the solvent-acid extract mixture is maintained in the still 30 and, by virtue of the temperature and pressure conditions which prevail therein, which are the boiling point of the hydrocarbon solvent at the pressure maintained on the still 30 and zone 29, there is removed by way of line 35 substantially purified tertiary olefin. The purified tertiary olefin passes through condenser-cooler 36, into which cooling medium is introduced by line 37, and recovered by line 35 as may be desired, a portion of the cooled tertiary olefin being returned to zone 29 by line 38 as reflux.

The liquid level 34 of material in still 30 is maintained by withdrawal by line 39 of hydrocarbon solvent-acid mixture into a separate zone 40 wherein hydrocarbon 41 separates from acid 42 in zone 40; the hydrocarbon being withdrawn by line 43, heated at least to approximately its boiling point under the pressure at which it is maintained in heater 44 through which a heating means is introduced by line 45 and recycled by way of line 32 containing pump 46 into the mixing device 33 as has been described.

The acid 42 in zone 40 is withdrawn by line 47 and a portion of the same is discharged by branch line 48 into line 49 controlled by valve 50 and pumped back into the still 30 by pump 51.

From time to time a portion of the acid may be discarded and this may be accomplished by opening valve 52 in line 50.

The acid in line 47 is pumped by pump 53 to line 17 for contacting with the pentylene fraction introduced by line 11. Fresh acid of 60 to 80 percent $H_2SO_4$ strength may be introduced by opening valve 54 in line 17.

It will be seen by reference to the drawing that the present invention provides a simplified, advantageous and useful mode for recovering purified tertiary olefins, the invention being particularly suitable for the recovery of isobutylenes from butylenes as well as the recovery of methylbutenes from pentylenes because of the simplified procedure. In the present invention, polymer formation is substantially suppressed with the consequent elimination of polymer recovery facilities as required by the prior art. Smaller equipment is usable because of high extraction rates and caustic and water washing, as needed in the prior art processes, is eliminated.

In the practice of the present invention, in accordance with the drawing the acid containing the isoolefin from the extraction step is contacted in a mixer with a heated vapor-liquid mixture of a heavier hydrocarbon at a temperature at least about the boiling point of the hydrocarbon. The high temperature and intimate mixing result in high rate of re-extraction of the tertiary olefin from the acid. At the same time, the high temperature flashes the tertiary olefin out of the heavier hydrocarbon phase and the distillation-extraction vessel thus acts as a reboiler for the distillation. It is thus possible to maintain a very low, steady-state concentration of the tertiary olefin in the acid and hydrocarbon phase, and thus polymerization of the tertiary olefins is avoided during the re-extraction and distillation. The re-extraction temperature is maintained by the choice of solvent at the proper boiling point. Illustrations of the solvents and the boiling points thereof have been given before.

An operation was performed in which an acid extract of isobutylene was contacted with isooctane at 210° F. and the admixture introduced into a still where isobutylene was flashed overhead and recovered. The purity of the isobutylene was 98.5 percent. Polymer formation was less than 2 percent.

The present invention is quite important and useful in that the tertiary olefins are very useful chemical reactants. For example, the methylbutenes may be employed as a feed stock to a dehydrogenation process to produce isoprene while the isobutylene is suitably used as a feed stock in reaction with isoprene to make butyl type rubbers.

The nature and objects of the present invention having been completely described and illustrated, what we wish to claim as new and useful and secure by Letters Patent is:

1. In the re-extraction of a $C_4$ to $C_6$ tertiary olefin from a 60% to 80% sulfuric acid extract
    wherein the tertiary olefin is recovered by distillation in a fractionating column
    the improvement which comprises contacting said acid extract with a hydrocarbon solvent boiling within the range from about 32° F. to about 350° F.
    at a ratio of solvent to extract from about 0.1:1 to about 20:1
    and at a temperature at least as high as the boiling point of said hydrocarbon solvent,
    said hydrocarbon solvent being at least partially vaporized,
    admixing said hydrocarbon solvent and said acid extract in a mixing zone to form an admixture of acid, hydrocarbon solvent, and tertiary olefin,
    and then passing said admixture of acid, hydrocarbon solvent, and tertiary olefin into the bottom of said fractionating column which is maintained at the boiling point of the hydrocarbon solvent,
    and recovering the tertiary olefin from said fractionating column as a purified product.

2. A method in accordance with claim 1 wherein the concentration of the tertiary olefin in the hydrocarbon solvent phase in the bottom of said column is maintained during distillation within the range of 0.5 to 5 percent by weight.

3. A method in accordance with claim 1 wherein the tertiary olefin is isobutylene.

4. A method in accordance with claim 1 wherein the tertiary olefin is a methyl butene.

5. In the recovery of a $C_4$ to $C_6$ tertiary olefin from admixture with its close boiling isomers wherein a hydrocarbon mixture containing the olefin is contacted with 60% to 80% sulfuric acid
  at a temperature within the range from 20° F. to 130° F.
  for a time period from 30 to 60 minutes
  to form a raffinate phase and an olefin-containing acid extract phase,
  wherein said acid extract phase is subjected to vacuum stripping at a pressure within the range from about 1 to about 29 inches of mercury absolute, and
  wherein the tertiary olefin is recovered by distillation in a fractionating column,
the improvement which comprises contacting the stripped acid extract with a hydrocarbon solvent boiling within the range from about 32° F. to about 350° F.
  at a ratio of solvent to extract from about 0.1:1 to about 20:1
  and at a temperature at least as high as the boiling point of said hydrocarbon solvent,
    said hydrocarbon solvent being at least partially vaporized,
  admixing said hydrocarbon solvent and said stripped acid extract in a mixing zone to form an admixture of acid, hydrocarbon solvent, and tertiary olefin,
  and then passing said admixture of acid, hydrocarbon solvent, and tertiary olefin into the bottom of said said fractionating column which is maintained at the boiling point of the solvent hydrocarbon,
  and recovering the tertiary olefin from said fractionating column as a purified product.

6. A method in accordance with claim 5 wherein the tertiary olefin is isobutylene.

7. A method in accordance with claim 5 wherein the tertiary olefin is a methyl butene.

8. A method in accordance with claim 5 wherein the concentration of the tertiary olefin in the hydrocarbon solvent phase in the bottom of said fractionating column is maintained during distillation within the range of 0.5 to 5 percent by weight.

References Cited in the file of this patent
UNITED STATES PATENTS

| | | |
|---|---|---|
| 2,049,247 | Burkhard | July 28, 1936 |
| 2,443,245 | Hibshman | June 15, 1948 |
| 2,509,885 | Rupp et al. | May 30, 1950 |
| 2,749,281 | Ferro | June 5, 1956 |
| 2,992,284 | Sanford et al. | July 11, 1961 |